United States Patent [19]
Arciprete

[11] 3,715,745
[45] Feb. 6, 1973

[54] DATA INPUT ENCODER

[75] Inventor: Genio R. Arciprete, Lexington, Mass.

[73] Assignee: Dennison Manufacturing Company, Framingham, Mass.

[22] Filed: Dec. 29, 1970

[21] Appl. No.: 102,365

[52] U.S. Cl. ........................340/347 DD, 340/174.1 A
[51] Int. Cl. ..................................................G06f 3/00
[58] Field of Search ......340/347 DD, 347 P, 174.1 A

[56] References Cited

UNITED STATES PATENTS

| | | | |
|---|---|---|---|
| 3,518,660 | 6/1970 | Nicklas | 340/347 DD |
| 3,255,338 | 6/1966 | Robinson | 340/347 P |

*Primary Examiner*—Thomas A. Robinson
*Assistant Examiner*—Jeremiah Glassman
*Attorney*—Dike, Thompson & Bronstein

[57] ABSTRACT

Encoder apparatus for generating a plurality of pulses indicative of the setting of a plurality of switches or the like, said apparatus including a plurality of switches having their common contacts ganged together and having their wiper arms coupled to different gating circuits, said gating circuits being actuated in a predetermined sequence to generate signals having a width proportional to the position of each wiper arm, and means responsive to the pulse width signal for generating pulse signals indicative of the position of each wiper arm.

13 Claims, 1 Drawing Figure

PATENTED FEB 6 1973 3,715,745
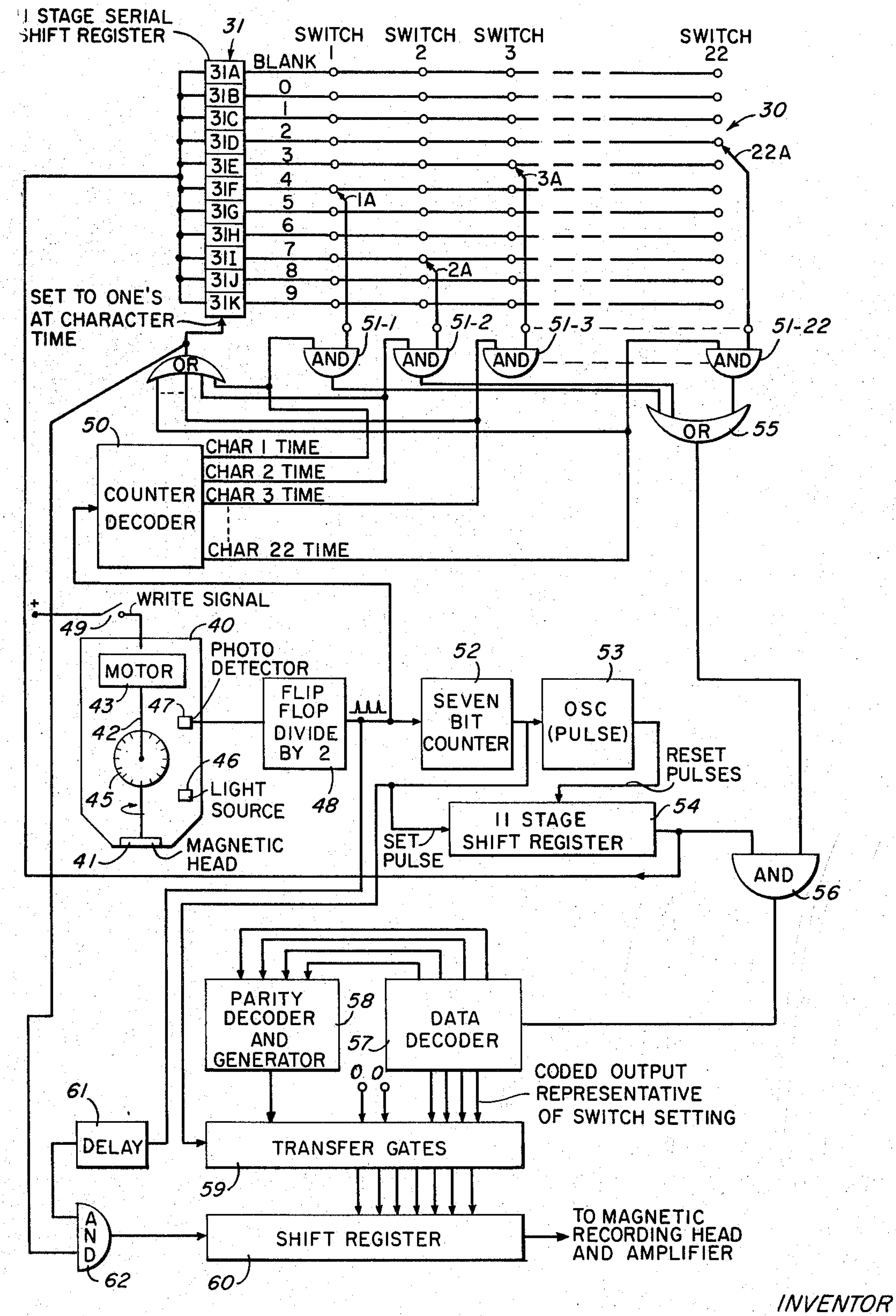
INVENTOR
GENIO R. ARCIPRETE
BY Dike, Thompson & Bronstein
ATTORNEYS

DATA INPUT ENCODER

DESCRIPTION OF THE INVENTION

This invention is directed to an encoder and is more particularly directed to a new and improved encoder for providing from a plurality of switch settings, a plurality of pulses representing the setting of each switch. This invention has particular utility in the magnetic encoding of tickets of the type shown in U.S. Pat. No. 3,517,612. In this patent there is described a system for magnetically encoding in serial fashion a plurality of characters on a concentric track of a magnetic recording media. In order to accomplish the above, data is first placed in the proper format to be serially recorded. The above mentioned patent generally describes such a system. The present invention is an improvement over the system disclosed in the aforementioned patent and in particular discloses an apparatus and method for sampling each manually settable multiple contact switch of a matrix of such switches to generate a first signal of a pulse width representative of the setting of each switch. Thereafter the first signal is used to gate a plurality of pulses to generate a code representing the setting of each switch. Sampling of each switch takes place in a manner such that the information contained in each switch is provided to a code converter in a serial fashion for subsequent coding of a magnetic recording media of a ticket of the type described in the aforementioned patent. This apparatus and method permits time sharing of expensive circuitry and thus provides a substantial cost reductions in the circuitry required to record data.

BRIEF DESCRIPTION OF DRAWINGS

The drawing schematically shows a block diagram of the data input encoder of the invention.

DESCRIPTION OF THE PREFERRED EMBODIMENT OF THE INVENTION

At 30 there is shown a bank of switches 1–22, each having contacts representing a blank, and the numbers 0–9, and each having manually positionable wiper arms *1a*, *2a*, *3a*–*22a*. The switches can be a conventional rotary switch having 11 contact points with a rotatable wiper arm positionable on one of said contacts. By manually positioning the wiper arms, data (information) to eventually be encoded and thereafter recorded (magnetically) is fed into the data input encoder. It should be understood that other types of switches either manually operable or automatically operable can be used in place of the switches shown. Also it should be understood that other information storage devices e.g., a plurality of flip-flops could be utilized in place of the switches as shown.

As shown, all of the common contact positions of each switch are connected or ganged together, that is all of the blank contact positions are coupled together, all of 0-contact positions are coupled together and so forth as shown.

As shown in the figure, each common contact line of each of the switches is coupled to an output line of a different stage of an eleven stage serial shift register shown at 31. The serial shift register is of the conventional type such as disclosed in U.S. Pat. No. 3,517,612 comprising the coupling of conventional flip-flops or as shown in the textbook "Digital Computer Fundamentals" by Thomas C. Bartel, 2nd Edition, McGraw-Hill Book Company. The stages are numbered as 31–A through 31–K. The shift register is controlled by timing signals derived from a magnetic recording device shown generally at 40, which is of the type disclosed in the aforementioned U.S. Pat. No. 3,516,612.

The recording device comprises a rotatable recording head 41 supported on a shaft 42 and driven by a motor 43. The head 41 is adapted to be positioned in proximity to a ticket carrying a magnetic recording media to record data on a concentric track thereof as shown in the aforementioned U.S. Pat. No. 3,517,612. Timing signals are derived by the use of an optically clear timing disc 44 attached to the shaft 42 and adapted to rotate therewith. The disc is provided with 308 timing marks some of which are shown at 45. Timing signals or pulses are obtained by the use of a light source 46 and photo detector 47 which detects the cutting of a light beam by the marks as the disc rotates. The 308 timing marks are electronically divided in half by a flip-flop divider 48 to provide 154 optical clock pulses.

The timing signals are used to gate signals through the system in the following manner: upon the closure of a start or write signal switch 49, the first timing signal is provided to a counter-decoder 50 for generating character 1 through character 22 time signals. The counter-decoder operates to provide an output signal on a different output line thereof upon the detection of the rise time of every eight mark on the optical disc. Thus 22 different character time signals are generated. The foregoing signals can be derived using the above counter and decoder constructed in a conventional manner well known in the art or could be derived from a conventional (154) stage serial shift register which is initially preset to all ones at the start of character encoding time by the write signal and thereafter bits from the coding disc shifts zeros therein to count. Thus the output from every seventh stage provides the character time signals. The character time signals are used to set all of the stages of the serial shift 31 to ones and also provide sequential enabling signals to gates, in this case AND gates 51–1 through 51–22. EAch of the gates are coupled to wiper arms *1a*–*22a* respectively as shown in the drawing. The enabling signals are provided to the gates 51–1 through 51–22 such that only one gate is enabled at any time.

The timing signals from the photo detector 47 are also used to shift in zeros into the shift register such that all ganged switch positions or contacts are scanned simultaneously. This is accomplished by feeding the optical clock pulses(154) into a seven bit counter 52 which provides an output signal every seventh pulse. These pulses are then fed into a free running pulse generating oscillator 53 to enable it to provide pulse signals at a repetition rate such that at least 11 pulses are provided between every seventh and eighth optical clock pulse. These oscillator pulses are then used to reset an 11 stage shift register 54 which has been initially set to a 1 by the bit counter 52 to generate 11 shift pulses for shift register 31.

Thus as each AND gate coupled to each switch is enabled sequentially upon the setting of a one into the shift register 31 and in the presence of the respective character time signals, a waveform transition will occur at the output of the respective AND gate. As the switches are scanned as zeros are shifted into the register 31, and depending upon the position of the respective wiper arm, a second transition in the output waveform from the AND circuit will occur as the respective shift register stage coupled to the AND circuit goes to zero. In this manner a pulse width modulated signal is derived from each of the AND gates representative of the position of the wiper arm on the contact of the switch. Thus, upon scanning switch 1, a waveform of a width representing six units of time after enablement of AND gate 51–1 will appear at the output of AND gate 51–1.

The pulse width signals from each of the AND gates or circuits 51–1 – 51–22 are then provided through an OR gate 55 to a second gating circuit, again in this case an AND gate 56 is shown. The pulse width signal is used to gate through the AND gate 56 a number of pulses from the shift register 54 representative of wiper arm position. Thus in the aforementioned case for switch 1, six pulses will be permitted to pass through gate 54 which number represents the setting of switch 1.

Obviously, the exact number of pulses permitted to pass through gate 56 can vary depending upon the frequency of the pulses from the shift register and/or the switch setting. In this manner sequencies of pulse patterns are developed as each switch is scanned and as each AND gate 51–1 and 51–22 are sequentially enabled.

The pulses passing through the gate 56 are then counted in a conventional data decoder 57 which converts them to a binary or other code representative of switch position. The data decoder merely counts pulses and thereafter generates a four-bit code representative of switch position. For example, a setting of 4 is converted to a binary 4(0100). In the case of a blank, a special code is derived in the decoder for the one pulse detected. The information from data decoder 55 is also used to generate a parity signal in a conventional manner by a parity decoder and generator shown at 58.

Thereafter the information is stored in transfer gates 59 to set up a seven-bit character with two zeros set into place between the data bits and the parity bit. The word or character in the transfer gates 59 is then transferred in parallel into a shift register 60 at the end of each seventh optical timing pulse. The information is then serially shifted out of the shift register 60 by the provision of delayed optical pulse signals using a monostable multivibrator delay circuit 61 and an AND gate 62 which is enabled at every character time to transfer the character to the recording head to be recorded.

I claim:

1. In combination, a plurality of switches, each switch having a plurality of contacts representing a code, the same coded contact of each switch ganged together and a wiper arm for each switch adapted to be positioned on one of the contacts of each switch, a serial shift register having different stage outputs thereof coupled to each of the ganged switch contacts and adapted to sequentially provide pulse signal to scan each of the ganged contacts one after the other in a predetermined order, timing means for generating timing signals to reset the shift register and thereafter sequentially shift in signals into the shift register to cause it to provide signals to said ganged switch contacts, a first gating circuit coupled to each of said wiper arms, character time generating means adapted to generate character time signals to sequentially enable one of said gates at a time to generate a pulse width signal of a width which is representative of the contact position of the wiper arm of each switch, a pulse signal source, and a second gating circuit responsive to signals from said pulse signal source and said pulse width signal to provide a signal indicative of the setting of the wiper arm of each of the switches.

2. A combination according to claim 1 in which said timing means comprises means for generating a plurality of pulses and wherein said character time generating means comprises means for counting said pulses to generate a plurality of character time signals to sequentially open each of said first gating circuits coupled to each of said switches.

3. A combination according to claim 1 in which said pulse width signal controls the number of pulses permitted to pass through said second gating circuit.

4. A combination according to claim 1 in which each of said switches have eleven contacts representing a blank and zero through nine, and wherein each switch contact representing the same code is coupled to the same contact representing the same code of the other switches.

5. A combination according to claim 1 in which all of the switch contacts are scanned between the start and end of each character time signal.

6. Encoding apparatus comprising a plurality of settable switches, each having a plurality of contacts coupled to different output line means for generating timing signals, first means responsive to said timing signals to simultaneously step by step scan the plurality of contacts of each of the plurality of settable switches, each of said switches having contactor means settable to any of said switch contacts, second means coupled to the contactor of each switch and responsive to the scanning of the contacts and a signal generated from said timing signals to generate a pulse width signal whose width is representative to the setting of the contactor of each of said switches, and third means responsive to the pulse width signals to generate one or more pulses representing of the setting of the contactor of each of the switches.

7. Encoding apparatus according to claim 6 in which said first means comprises a serial shift register which is initially set and then sequentially reset to sequentially scan each of the contacts of each of said switches.

8. Encoding apparatus according to claim 6 in which the timing signals are decoded to generate character time signals which are then used to sequentially open and close said second means.

9. Encoding apparatus according to claim 6 in which said third means comprises a clock providing a predetermined number of clock pulses per number of timing signals and gating means responsive to said clock pulses and said pulse width signal.

10. Encoding apparatus according to claim 9 in which said gating means is an AND gate.

11. A system for generating a plurality of pulses corresponding to the width of a signal comprising first means for generating a signal of a variable pulse width, second means for generating a number of pulses, and third means for permitting one or more of said number of pulses to be transmitted therefrom to coding means depending upon the width of said signal, said first means comprises a serial shift of n stages having an output signal line for each stage, connecting means having a plurality of contacts coupled to selected ones of said output signal lines, timing means for first setting each of the n stages output signal lines to a predetermined signal level and thereafter sequentially changing the signal level of the output signal lines until all signal levels of each of the output signal lines are the same and a wiper arm movable between said contacts, said arm being coupled to said third means.

12. A system for generating a plurality of pulses corresponding to the width of a signal comprising first means for generating a signal of variable pulse widths, second means for generating a number of pulses, third means for permitting one or more of said number of pulses to be transmitted therefrom to coding means depending upon the width of said signal, said first means comprises a serial shift register of n stages having an output line for each stage, connecting means adapted to be coupled to anyone of said output lines, and timing means for first setting each of the n stage output lines to a predetermined signal level and then sequentially changing the signal level of the output lines until all signal levels of each of the output lines are the same.

13. A system according to claim 12 in which said connecting means comprises a multiple contact switch having a contact coupled to a different one of said output lines and a wiper arm movable between contacts, said arm being coupled to said third means.

* * * * *